United States Patent
Harrick et al.

(10) Patent No.: US 8,514,664 B2
(45) Date of Patent: Aug. 20, 2013

(54) SYSTEM AND METHOD FOR GATHERING MARINE GEOPHYSICAL DATA

(75) Inventors: Bruce William Harrick, Sugar Land, TX (US); Andre Stenzel, Sugar Land, TX (US)

(73) Assignee: PGS Geophysical AS, Lysaker (NO)

( * ) Notice: Subject to any disclaimer, the term of this patent is extended or adjusted under 35 U.S.C. 154(b) by 714 days.

(21) Appl. No.: 12/799,042

(22) Filed: Apr. 16, 2010

(65) Prior Publication Data

US 2011/0255369 A1    Oct. 20, 2011

(51) Int. Cl.
*G10K 11/00* (2006.01)
(52) U.S. Cl.
USPC .......................................... 367/173; 181/120
(58) Field of Classification Search
USPC ............... 367/173, 154, 165; 181/113, 120
See application file for complete search history.

(56) References Cited

U.S. PATENT DOCUMENTS

| | | | |
|---|---|---|---|
| 4,092,858 A | 6/1978 | Edgerton | |
| 4,751,113 A | 6/1988 | Riccio et al. | |
| 4,984,218 A | 1/1991 | Ritter et al. | |
| 5,228,005 A | 7/1993 | Bjelland | |
| 5,302,414 A | 4/1994 | Alkhimov et al. | |
| 5,532,980 A | 7/1996 | Zarate et al. | |
| 5,735,226 A | 4/1998 | McNeal | |
| 6,009,042 A | 12/1999 | Workman et al. | |
| 6,069,845 A * | 5/2000 | Ambs | 367/165 |
| 6,108,274 A * | 8/2000 | Pearce | 367/157 |
| 6,262,945 B1 * | 7/2001 | Maples et al. | 367/154 |
| 6,294,727 B1 * | 9/2001 | Orlean | 174/11 R |
| 7,022,750 B2 | 4/2006 | Camp et al. | |
| 7,211,173 B1 | 5/2007 | Staerzl et | |
| 7,487,840 B2 | 2/2009 | Gammage et al. | |
| 7,835,222 B2 | 11/2010 | Lobe et al. | |
| 8,091,647 B2 | 1/2012 | Nicholson | |
| 2004/0246818 A1 * | 12/2004 | Maples et al. | 367/173 |
| 2006/0090593 A1 | 5/2006 | Liu | |
| 2006/0144286 A1 | 7/2006 | Baum | |
| 2006/0203613 A1 | 9/2006 | Thomsen et al. | |
| 2008/0192569 A1 | 8/2008 | Ray et al. | |
| 2009/0097356 A1 | 4/2009 | Haldorsen et al. | |
| 2010/0020644 A1 | 1/2010 | Vignaux | |

(Continued)

FOREIGN PATENT DOCUMENTS

| | | |
|---|---|---|
| EP | 0465172 A1 | 1/1992 |
| GB | 2394479 B | 5/2005 |
| WO | 8910947 A1 | 11/1989 |
| WO | 2008121418 A1 | 10/2008 |

OTHER PUBLICATIONS

P. J. Baum, Go-Faster Strips, Stripes, Riblets, etc.: Speedskating Drag Reduction and the 'Lost Dutchman Olympic Gold Mine' Speedskating Santa Barbara, Feb. 14, 1998.

(Continued)

*Primary Examiner* — Mark Hellner

(57) ABSTRACT

A system comprises marine geophysical equipment, adapted for towing through a body of water; and tightly fitting covers, attached to the marine seismic equipment, to fill-in indentations in the marine geophysical equipment, for gathering marine geophysical data. A method comprises marine geophysical equipment having tightly fitting covers, to fill-in indentations in the marine geophysical equipment, attached thereto, for gathering marine geophysical data.

14 Claims, 2 Drawing Sheets

(56) References Cited

U.S. PATENT DOCUMENTS

| | | |
|---|---|---|
| 2010/0108813 A1 | 5/2010 | Lang |
| 2010/0269731 A1 | 10/2010 | Tofte Jespersen et al. |
| 2010/0278011 A1 | 11/2010 | Harrick |
| 2010/0278771 A1 | 11/2010 | Lobe et al. |
| 2011/0123477 A1 | 5/2011 | Mount et al. |
| 2011/0174207 A1 | 7/2011 | Harrick et al. |
| 2011/0311769 A1 | 12/2011 | Chen et al. |
| 2012/0243370 A1 | 9/2012 | Vignaux |
| 2012/0250458 A1 | 10/2012 | Tonchia |
| 2012/0301423 A1 | 11/2012 | Chai et al. |
| 2012/0321809 A1 | 12/2012 | Hartshorne et al. |
| 2013/0039153 A1 | 2/2013 | Hartshorne et al. |

OTHER PUBLICATIONS

D.W. Bechert, M. Bruse, W. Hage, R. Meyer, Fluid Mechanics of Biological Surfaces and Their Technological Application, Springer-Verlag 2000.

William H. Dresher, Ph.D., Copper in Third-Generation Antifoulants for Marine Coatings, www.copper.org, Sep. 000.

J. Karthikeyan, Cold Spray Technology: International Status And USA Efforts, Barberton, Ohio, USA, ASB Industries Inc., Dec. 2004.

NASA Riblets for Stars & Stripes, Fact Sheets, www.nasa.gov, Oct. 1993.

Martha J. Heil, Shark-Inspired Boat Surface Materials Engineers Turn to Ferocious Fish for Nonstick Ship Coating, American Institute of Physics, www.aip.org, May 1, 2005.

* cited by examiner

SYSTEM AND METHOD FOR GATHERING MARINE GEOPHYSICAL DATA

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of marine geophysical surveys.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. Well-known techniques of geophysical prospecting include seismic and electromagnet surveys. The resulting geophysical data are processed to yield information relating to the geologic structure and properties of the subterranean formations in the area being surveyed.

In a marine seismic survey, seismic energy sources are used to generate a seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) and recorded.

The appropriate seismic sources for generating the seismic signal in marine seismic surveys typically include a submerged seismic source towed by a ship and periodically activated to generate an acoustic wavefield. The seismic source generating the wavefield is typically an air gun or a spatially-distributed array of air guns.

The appropriate types of seismic sensors typically include particle velocity sensors (typically, geophones) and water pressure sensors (typically, hydrophones) mounted within a towed seismic streamer (also known as a seismic cable). Seismic sensors are commonly deployed in sensor arrays within the streamer.

Seismic sources, seismic streamers, and other attached equipment are towed behind survey vessels, attached by cables. The seismic sources and seismic streamers may be positioned in the water by attached equipment, such as deflectors and cable positioning devices (also known as "birds").

Another technique of geophysical prospecting is an electromagnetic survey. Electromagnetic sources and receivers include electric sources plus magnetic sources and receivers. The electric and magnetic receivers can include multi-component receivers to detect horizontal and vertical electric signal components and horizontal and vertical magnetic signal components. In some electromagnetic surveys, the sources and receivers are towed through the water, possibly along with other equipment. The electromagnetic sources and receivers are sometimes towed in streamers, as described above for the seismic receivers.

Unfortunately, marine organisms adhere to nearly everything that moves through water for significant periods of time, including towed geophysical equipment. This adherence of marine organisms is known as "bio-fouling". Bio-fouling is conventionally conceived of in terms of barnacles, but also includes the growth of mussels, oysters, algae, tubeworms, slime, and other marine organisms.

Thus, a need exists for a system and a method for protecting towed geophysical equipment in marine geophysical surveys, especially towed streamers and equipment attached thereto, from marine growth. A need also exists for a system and method for reducing drag resistance on the towed geophysical equipment.

BRIEF SUMMARY OF THE INVENTION

The invention is a system and a method gathering marine geophysical data. In one embodiment, the invention is a system comprising marine geophysical equipment, adapted for towing through a body of water, and tightly fitting covers, attached to the marine geophysical equipment, to fill-in indentations in the marine geophysical equipment. In another embodiment, the invention is a method comprising towing marine geophysical equipment having tightly fitting covers, attached thereto, to fill-in indentations in the marine geophysical equipment.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a system and a method for gathering marine geophysical data. In particular, the invention is a system and a method for protecting towed marine geophysical equipment from marine growth. Consequently, the invention is also system and a method for reducing drag on the towed marine geophysical equipment. The following discussion of the invention will be illustrated in terms of towed streamers, but this is not a limitation of the invention. Any form of marine geophysical equipment that is adapted for towing through a body of water and is vulnerable to marine growth is considered appropriate for application of the present invention.

Barnacle larvae evolve through two stages, nauplae and cyprid. When they reach the cyprid stage, the barnacle larvae endeavor to find a hard surface to adhere to and settle on. When the barnacle larvae find a suitable surface, they anchor onto the surface, using hair-like tentacles, and then excrete a cement-like substance to adhere to the surface. A large number of barnacles are observed in areas of low shear force, such as behind an obstruction to normal turbulent flow. These areas include the stern end of weight blocks and bird collars. The initial larvae settlement may be an accidental occurrence, but cyprids are free-swimming and can propel themselves in the direction of established barnacles once they sense their presence. The sensing of other barnacles is accomplished by barnacles exuding pheromones which attract others seeking to establish colonies. Therefore, if a small number have established themselves in an indentation such as a groove on a streamer, then the numbers will increase very rapidly.

To eliminate these areas of preferred barnacle settlement, the indentations along the entire length of the towed streamer are enclosed within shallow covers. The indentation is eliminated, thus removing an initial settling location for barnacle larvae, where strongest larvae growth develops. Turbulence is sustained over what were previous interruptions to water flow, thus eliminating the areas of low surface friction which develop behind the interruptions to flow. This turbulence reduces the number of successful attachments to the streamer skin and attenuates the development of barnacle colonization.

Figure 1:
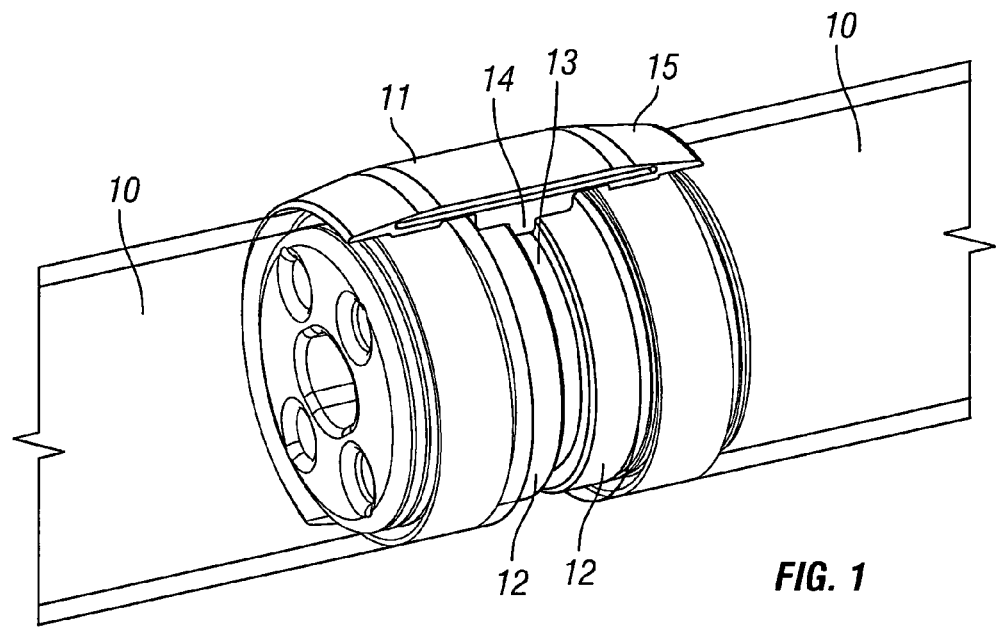
FIG. 1 is a perspective sectional view of a connector cover for a streamer.
Figure 2A:
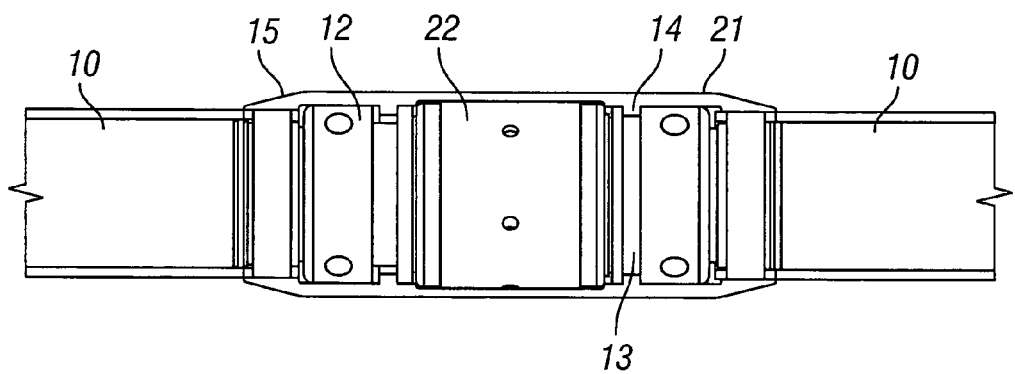
FIG. 2A is a side sectional view of another connector cover for a streamer.
Figure 2B:
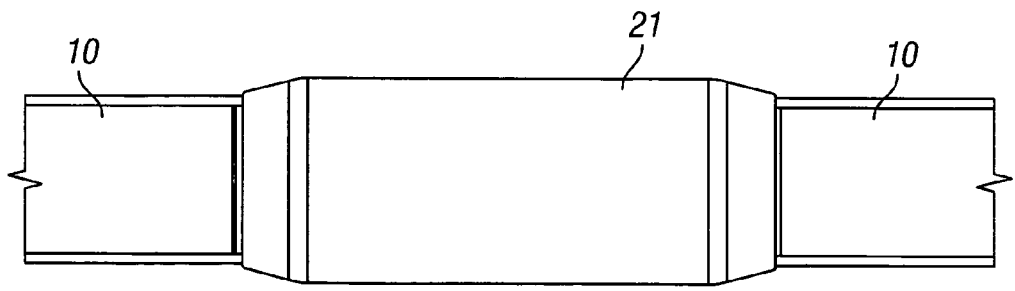
FIG. 2B is a side view of the connector cover shown in sectional in FIG. 2A.
Figure 3:
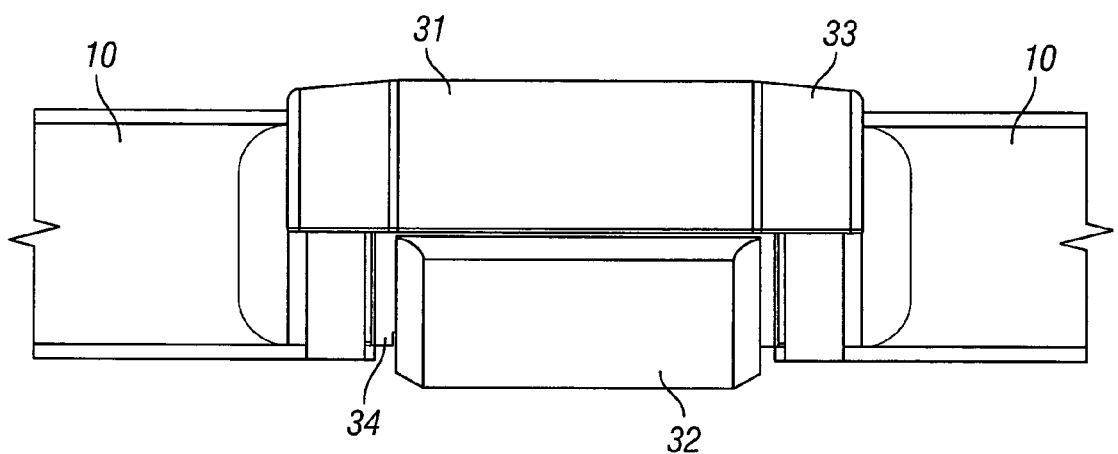
FIG. 3 is a partial sectional view of a ballast weight extension for a ballast weight on a streamer.

FIGS. 1 to 3 show various covers, according to the invention, for marine geophysical equipment, adapted for towing through a body of water. FIGS. 1 to 3 illustrate several embodiments of the invention, but are not mean to restrict the invention to the embodiments shown. FIG. 1 is a perspective sectional view of a connector cover for a streamer. Two streamer sections 10 are shown, connected together under a connector cover 11 of the invention. In various embodiments, the connector cover 11 is made from either rubber or plastic materials. The two ends 12 of the two streamer sections 10 connect, resulting in indentations 13, such as grooves, at the connection. The connector cover 11 is adapted to fit as tightly as possible to eliminate or minimize any edge or crack that could provide a settling location for barnacle larvae. Thus, the connection cover 11 is adapted with projections 14 to fill in the indentations 13 in the marine geophysical equipment, such as the streamer sections 10 illustrated here, and make a tight connection. In another embodiment, the connector cover 11 has tapered end portions 15 to make the connector cover 11 streamlined.

FIGS. 2A and 2B show side views of another connector cover of the invention. FIG. 2A is a side sectional view of another connector cover for a streamer. Two streamer sections 10 are shown, connected together under a connector cover 21 of the invention. In various embodiments, the connector cover 21 is made from either rubber or plastic materials. As in FIG. 1 above, the two ends 12 of the two streamer sections 10 connect, resulting in indentations 13, such as grooves, at the connection. The connection cover 21 is adapted with projections 14 to fill in the indentations 13 and make a tight connection. In another embodiment, the connector cover 21 has tapered end portions 15 to make the connector cover 21 streamlined. The connector cover 21 is similar to but longer than the connection cover 11 illustrated in FIG. 1. The extra length is provided so that the connector cover 21 can accommodate an additional module 22 attached between the two ends 12 of the two streamer sections 10. The additional module 22 comprises, but is not limited to, connectors, connector and cable module combinations, unpopulated weight block bases, and tie off points.

FIG. 2B is a side view of the connector cover shown in sectional in FIG. 2A. Two streamer sections 10 are shown, connected together under the longer connector cover 21.

In further embodiments, the rubber or plastic surfaces of the connector covers 11, 21 shown in FIGS. 1, 2A, and 2B can be treated with copper or copper alloy particles, by methods known as "metal cold spraying", "plasma coating" or other suitable methods. In yet further embodiments, the connector covers 11, 21 can be treated with antifouling paints suitable for the cover surface materials. These treatments will further enhance the antifouling properties of the connector covers 11, 21 of the invention.

FIG. 3 is a partial sectional view of a ballast weight extension for a ballast weight on a streamer. A streamer section 10 is shown, with a ballast weight extension 31 of the invention that replaces a ballast weight 32 attached to a ballast mounting block 34 on the streamer section 10. In this embodiment, the ballast weight extension 31 is an extension of a ballast weight block 32 attached at ballast mounting blocks 34 along a streamer section 10 to maintain neutral buoyancy of the streamer. In another embodiment (not shown), ballast mounting block covers, analogous to the ballast weight extensions 31, are also attached at ballast mounting blocks 34 along the streamer section 10 that are not populated by ballast weight blocks 32, to retain a hydrodynamic profile. As with the connector covers 11, 21 illustrated above in FIGS. 1, 2A, and 2B, the ballast weight extension 31 and the ballast mounting block cover are adapted to fit as tightly as possible to eliminate or minimize any edge or crack that could provide a settling location for barnacle larvae. In another embodiment, the ballast weight extension 31 optionally has tapered end portions 33 to make the ballast weight extension 31 streamlined. The ballast mounting block cover may be similarly streamlined with tapered end portions. In another embodiment, the ballast weight extension 31 and the ballast weight block 32 are made of a material such as Naval Bronze or other suitable copper alloy. In another embodiment, the ballast weight extension 31 and the ballast mounting block cover are adapted to have a hydro-dynamic shape.

Use of the covers (and ballast weight extension) of the invention will prevent or reduce invertebrate settlement on streamers. Reduction of marine growth on marine towed geophysical equipment will result in several advantages, including the following.

Additionally, the reduction of marine growth may reduce eddy formation at the surfaces of the towed equipment, which could bring about a consequent reduction of noise caused by the turbulent flow. The quieter towing would improve the signal-to-noise ratio, a great benefit in geophysical surveying.

The reduction of marine growth will reduce drag on the towed streamer, allowing the equipment to be towed through the water with higher energy efficiency. This higher efficiency could produce a reduction in fuel costs for the same survey configuration. Alternatively, the higher efficiency could allow greater towing capacity (such as an increase in the number of streamers, the length of each streamer, or the towing spread) at the current fuel costs and towing power of the geophysical vessel.

The reduction of marine growth will reduce production time lost to cleaning or replacing towed geophysical equipment, and, in particular, will enable streamer scrapers (cleaners) to operate more efficiently by the elimination of areas of strong initial growth, which are also where scrapers cannot penetrate, thus extending periods between when scraping is required. This will also reduce work boat and cleaning equipment exposure hours for the crew. The reduction of marine growth will reduce the wear and extend the operational life of the towed geophysical equipment. All of these effects will increase the return on initial investment.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A system for gathering marine geophysical data, comprising:
   marine geophysical equipment, adapted for towing through a body of water; and
   tightly fitting covers, attached to the marine geophysical equipment, with projections to fill in indentations in the marine geophysical equipment, thereby to substantially eliminate indentations on the surface of the covered marine geophysical equipment.

2. The system of claim 1, wherein the marine geophysical equipment comprises at least one of: towed marine streamers, marine seismic equipment, and marine electromagnetic equipment.

3. The system of claim 1, wherein the covers reduce marine growth on the marine geophysical equipment.

4. The system of claim 3, wherein the covers reduce drag on the marine geophysical equipment.

5. The system of claim 1, wherein the covers comprise at least one of: shallow covers over streamer connections on the marine geophysical equipment, shallow covers over ballast mounting blocks on the marine geophysical equipment, and extensions of ballast weight blocks on the marine geophysical equipment.

6. The system of claim 1, wherein the covers have a hydro-dynamic shape.

7. The system of claim 1, wherein the covers further comprise tapered end portions.

8. A method for gathering marine geophysical data, comprising:
   towing marine geophysical equipment through a body of water, and
   disposing tightly fitting coverings with projections to fill in indentations on the marine geophysical equipment, wherein the covers substantially eliminate indentations on the surface of the covered marine geophysical equipment.

9. The method of claim 8, wherein the marine geophysical equipment comprises at least one of: towed marine streamers, marine seismic equipment, and marine electromagnetic equipment.

10. The method of claim 8, wherein the covers reduce marine growth on the marine geophysical equipment.

11. The method of claim 10, wherein the covers reduce drag on the marine geophysical equipment.

12. The method of claim 8, wherein the covers comprise at least one of: shallow covers over streamer connections on the marine geophysical equipment, extensions of ballast weight blocks on the marine geophysical equipment, and shallow covers over ballast mounting blocks on the marine geophysical equipment.

13. The system of claim 8, wherein the covers have an hydro-dynamic shape.

14. The method of claim 8, wherein the covers further comprise tapered end portions.

* * * * *